United States Patent
Jang et al.

(10) Patent No.: US 11,579,271 B2
(45) Date of Patent: Feb. 14, 2023

(54) LIDAR NOISE REMOVAL APPARATUS AND LIDAR NOISE REMOVAL METHOD THEREOF

(71) Applicants: Hyundai Motor Company, Seoul (KR); Kia Motors Corporation, Seoul (KR)

(72) Inventors: Yoon Ho Jang, Gyeonggi-do (KR); Soo Kyung Ryu, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 388 days.

(21) Appl. No.: 16/860,346

(22) Filed: Apr. 28, 2020

(65) Prior Publication Data
US 2021/0239809 A1     Aug. 5, 2021

(30) Foreign Application Priority Data

Jan. 30, 2020   (KR) .................. 10-2020-0011089

(51) Int. Cl.
| | |
|---|---|
| G01C 3/08 | (2006.01) |
| G01S 7/497 | (2006.01) |
| G01S 17/931 | (2020.01) |
| G01S 7/487 | (2006.01) |
| G01S 17/02 | (2020.01) |
| G06V 10/30 | (2022.01) |

(52) U.S. Cl.
CPC ............ *G01S 7/497* (2013.01); *G01S 7/4876* (2013.01); *G01S 17/02* (2013.01); *G01S 17/931* (2020.01); *G06V 10/30* (2022.01)

(58) Field of Classification Search
None
See application file for complete search history.

(56) References Cited

U.S. PATENT DOCUMENTS

| | | | |
|---|---|---|---|
| 11,172,192 B2 * | 11/2021 | Lu .................. | H04N 17/002 |
| 2019/0186931 A1 * | 6/2019 | Dittmer .............. | G01C 21/3602 |
| 2020/0213581 A1 * | 7/2020 | Lu ..................... | G06T 7/0004 |

FOREIGN PATENT DOCUMENTS

CN       113261278 A * 12/2019 ........... H04N 5/3572

* cited by examiner

*Primary Examiner* — Mark Hellner
(74) *Attorney, Agent, or Firm* — Fox Rothschild LLP (57) ABSTRACT

A LIDAR noise removal apparatus and a LIDAR noise removal method thereof are provided. The apparatus includes a LIDAR detection information processor that processes LIDAR detection information received from a LIDAR of a vehicle. A sun position acquirer acquires an azimuth angle and elevation angle of the sun relative to a traveling direction of the vehicle. An ROI selector selects an ROI corresponding to the sun from a front image of the vehicle based on the azimuth angle and elevation angle and compares a brightness of the selected ROI with a threshold value. A noise region selector selects a noise region corresponding to the ROI from the LIDAR detection information based on the azimuth angle and elevation angle when the brightness of the ROI exceeds the threshold value, and a noise remover removes noise points in the selected noise region.

18 Claims, 6 Drawing Sheets

LIDAR NOISE REMOVAL APPARATUS AND LIDAR NOISE REMOVAL METHOD THEREOF

CROSS-REFERENCE TO RELATED APPLICATION(S)

This application claims the benefit of Korean Patent Application No. 10-2020-0011089, filed on Jan. 30, 2020, which is hereby incorporated by reference as if fully set forth herein.

BACKGROUND

Field of the Invention

The present disclosure relates to a Light Detection And Ranging (LIDAR) noise removal apparatus, and more particularly, to a LIDAR noise removal apparatus which is capable of removing LIDAR noise resulting from sunlight and a LIDAR noise removal method thereof.

Discussion of the Related Art

In general, a Light Detection And Ranging (LIDAR) is a sensor configured to detect a surrounding object by transmitting light and receiving light reflected from the object, and may use light of a wavelength of about 905 nm or about 1550 nm. However, when sunlight including light components of all wavelengths is irradiated to the LIDAR, noise may be generated at object points of a detection signal in the LIDAR. Such noise may be irregularly generated in the direction of the sun, and may adversely affect accuracy of detection of an object when the object is present in the direction of the sun.

When noise is clustered together with an object, it may adversely affect size information, position information and heading information of the object and thus degrade recognition performance of the LIDAR. Accordingly, there is a need for development of a LIDAR noise removal apparatus which is capable of estimating direction and position components relative to the sun to remove sunlight noise and effectively extract an object.

SUMMARY

Accordingly, the present disclosure is directed to a LIDAR noise removal apparatus and a LIDAR noise removal method thereof that substantially obviate one or more problems due to limitations and disadvantages of the related art. An object of the present disclosure is to provide a LIDAR noise removal apparatus which is capable of predicting a direction and a position relative to the sun based on Global Positioning System (GPS) information and image information to effectively remove noise points resulting from sunlight without loss in object information and a LIDAR noise removal method thereof.

Objects of the present disclosure devised to solve the problems are not limited to the aforementioned object, and other unmentioned objects will be clearly understood by those skilled in the art based on the following detailed description of the present disclosure.

To achieve these objects and other advantages and in accordance with the purpose of the disclosure, as embodied and broadly described herein, a LIDAR noise removal apparatus may include a LIDAR detection information processor configured to process LIDAR detection information received from a LIDAR of a vehicle, a sun position acquirer configured to acquire an azimuth angle and elevation angle of the sun relative to a traveling direction of the vehicle, a Region Of Interest (ROI) selector configured to select an ROI that corresponds to the sun from a front image of the vehicle based on the acquired azimuth angle and elevation angle of the sun and compare a brightness of the selected ROI with a threshold value to determine whether the brightness of the ROI exceeds the threshold value, a noise region selector configured to select a noise region that corresponds to the ROI from the LIDAR detection information based on the azimuth angle and elevation angle of the sun when the brightness of the ROI exceeds the threshold value, and a noise remover configured to remove noise points in the selected noise region.

In another aspect of the present disclosure, a LIDAR noise removal method of a LIDAR noise removal apparatus, which receives LIDAR detection information from a LIDAR of a vehicle, may include processing the LIDAR detection information received from the LIDAR of the vehicle, acquiring an azimuth angle and elevation angle of the sun relative to a traveling direction of the vehicle, selecting a Region Of Interest (ROI) that corresponds to the sun from a front image of the vehicle based on the acquired azimuth angle and elevation angle of the sun, comparing a brightness of the selected ROI with a threshold value to determine whether the brightness of the ROI exceeds the threshold value, selecting a noise region that corresponds to the ROI from the LIDAR detection information based on the azimuth angle and elevation angle of the sun when the brightness of the ROI exceeds the threshold value, and removing noise points in the selected noise region.

In another aspect of the present disclosure, a non-transitory computer-readable recording medium for storing a program for execution of a LIDAR noise removal method of a LIDAR noise removal apparatus executes processes included in the LIDAR noise removal method.

In another aspect of the present disclosure, a vehicle may include a LIDAR configured to sense surrounding object information of the vehicle, a camera configured to acquire a front image of the vehicle, and a LIDAR noise removal apparatus configured to remove noise points that correspond to sunlight incident on the LIDAR, wherein the LIDAR noise removal apparatus may include a LIDAR detection information processor configured to process LIDAR detection information received from the LIDAR, a sun position acquirer configured to acquire an azimuth angle and elevation angle of the sun relative to a traveling direction of the vehicle, a Region Of Interest (ROI) selector configured to select an ROI that corresponds to the sun from the front image of the vehicle based on the acquired azimuth angle and elevation angle of the sun and compare a brightness of the selected ROI with a threshold value to determine whether the brightness of the ROI exceeds the threshold value, a noise region selector configured to select a noise region that corresponds to the ROI from the LIDAR detection information based on the azimuth angle and elevation angle of the sun when the brightness of the ROI exceeds the threshold value, and a noise remover configured to remove noise points in the selected noise region.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate exemplary embodiment(s) of the disclosure and together with the description serve to explain the principle of the disclosure. In the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present disclosure, examples of which are illustrated in the accompanying drawings. The following exemplary embodiments are given by way of example in order to enable those skilled in the art to fully understand the idea of the present disclosure. Therefore, the present disclosure is not limited by the following exemplary embodiments, and may be realized in various other forms. In order to clearly describe the present disclosure, parts having no relation to the description of the present disclosure have been omitted from the drawings. Wherever possible, the same reference numerals will be used throughout the specification to refer to the same or like parts.

Hereinafter, a LIDAR noise removal apparatus and a LIDAR noise removal method thereof which may be applied to exemplary embodiments of the present disclosure will be described in detail with reference to FIGS. 1 to 9.

Figure 1:
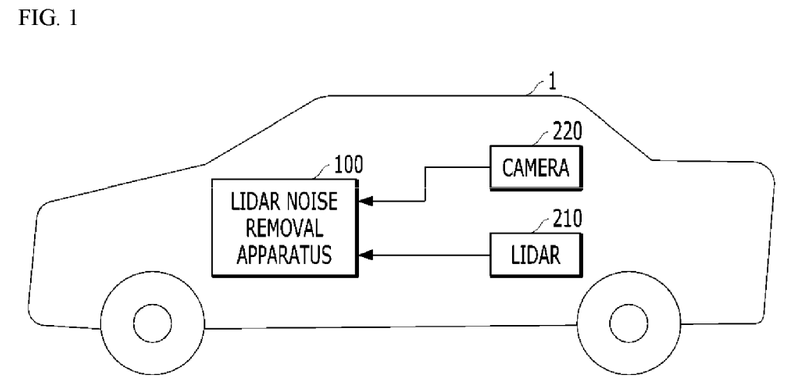
FIG. 1 is a view illustrating a vehicle including a LIDAR noise removal apparatus according to an exemplary embodiment of the present disclosure.

FIG. 1 is a view illustrating a vehicle including a LIDAR noise removal apparatus according to an exemplary embodiment of the present disclosure. As shown in FIG. 1, a vehicle 1 may include a LIDAR 210 configured to sense surrounding object information of the vehicle 1, a camera 220 configured to acquire a front image of the vehicle 1, and a LIDAR noise removal apparatus 100 configured to remove noise points corresponding to sunlight incident on the LIDAR 210.

In particular, the Light Detection And Ranging (LIDAR) may be a multi-channel LIDAR having a front LIDAR and front-side LIDAR of the vehicle 1, but is not limited thereto. For example, the multi-channel LIDAR may include a plurality of layers, each having a designated angle. The LIDAR may be configured to sense an object around the vehicle 1 and generate LIDAR detection information of a LIDAR sensor coordinate base, which may be coordinate-converted into a coordinate base of the front image acquired from the camera 220.

The LIDAR noise removal apparatus 100 may be configured to select a Region Of Interest (ROI) that corresponds to the sun from the front image of the vehicle 1 based on an azimuth angle and elevation angle of the sun, compare a brightness of the selected ROI with a threshold value, select a noise region that corresponds to the ROI from the LIDAR detection information when the brightness of the ROI exceeds the threshold value, and remove noise points in the selected noise region.

On the other hand, when the brightness of the ROI is less than or equal to the threshold value, the LIDAR noise removal apparatus 100 may be configured to assign object point flags to all points in the noise region that corresponds to the ROI, modify a labeling parameter for the noise region, distinguish between object points and noise points in the noise region such that an overlapping object in the noise region is not removed, and remove only the distinguished noise points. Particularly, the LIDAR noise removal apparatus 100 may be configured to distinguish between object points and noise points in the noise region that corresponds to the ROI by modifying the labeling parameter to reduce a distance threshold value for the distance between points in the noise region.

In other words, when the brightness of the ROI exceeds the threshold value, the LIDAR noise removal apparatus 100 may be configured to recognize that sunlight is irradiated to the LIDAR of the vehicle, and remove noise points in the noise region that corresponds to the ROI. In some cases, when the brightness of the ROI exceeds the threshold value, the LIDAR noise removal apparatus 100 may be configured to recognize that sunlight is irradiated to the LIDAR of the vehicle and there is no object in the noise region that corresponds to the ROI.

In addition, when the brightness of the ROI is less than or equal to the threshold value, the LIDAR noise removal apparatus 100 may be configured to assign object point flags to all points in the noise region that correspond to the ROI to prevent an object existing in the noise region from being recognized and removed as noise, and modify a labeling parameter for the noise region. On the other hand, the LIDAR noise removal apparatus 100 may be configured to receive LIDAR detection information from the LIDAR 210 of the vehicle 1 and parse the received LIDAR detection information to process the same.

The LIDAR noise removal apparatus 100 may then be configured to acquire position information, heading information and time information of the vehicle 1 and extract an azimuth angle and elevation angle of the sun relative to a traveling direction of the vehicle 1 based on the acquired position information, heading information and time information of the vehicle 1. In particulra, the LIDAR noise removal apparatus 100 may be configured to acquire the position information, heading information and time information of the vehicle 1 from a Global Positioning System (GPS), but is not limited thereto.

Further, the LIDAR noise removal apparatus 100 may be configured to acquire a front image of the vehicle 1, convert the azimuth angle and elevation angle of the sun into coordinates of the LIDAR and coordinates of the front image and select an ROI that corresponds to the sun from the front image. Particularly, the LIDAR noise removal apparatus 100 may be configured to acquire the front image of the vehicle 1 from the camera 220 (or other imaging device) of the vehicle 1, but is not limited thereto. Upon selecting the ROI corresponding to the sun from the front image of the vehicle 1, the LIDAR noise removal apparatus 100 may be configured to calculate a brightness of the selected ROI and determine whether the calculated brightness of the ROI exceeds a threshold value.

For example, the LIDAR noise removal apparatus 100 may be configured to convert an image of the selected ROI into a grayscale image and calculate the brightness of the ROI using a binary value of the converted image, but is not limited thereto. In addition, the LIDAR noise removal apparatus 100 may be configured to vary the threshold value with the elevation of the sun. For example, the LIDAR noise removal apparatus 100 may be configured to increase the threshold value when the elevation of the sun is about 10° or less from the horizon.

This results from the fact that, when the elevation of the sun is about 10° or less from the horizon, an object existing in front of the sun may be misrecognized and removed as noise resulting from the sun when the brightness of the ROI that corresponds to the sun in the front image is greater than the threshold value even though the sun is present behind the object. Accordingly, when the elevation of the sun is about 10° or less from the horizon, the LIDAR noise removal apparatus 100 may be configured to set the threshold value to a higher value (e.g., an increased value) to prevent an object from being misrecognized and removed as noise resulting from the sun even when the brightness of the ROI in which the object is present between the sun and the vehicle is greater than the threshold value.

When the brightness of the ROI exceeds the threshold value, the LIDAR noise removal apparatus 100 may be configured to recognize that sunlight is irradiated to the vehicle, extract a layer of the LIDAR 210 that corresponds to the elevation of the sun, an angle that corresponds to the azimuth of the sun and a filter value, and select a noise region that corresponds to the ROI from the LIDAR detection information based on the extracted layer, angle and filter value. The filter value may be calculated and updated in real time based on a variation in time and a variation in heading of the vehicle.

Further, upon selecting the noise region that corresponds to the ROI, the LIDAR noise removal apparatus 100 may be configured to assign noise point flags to points in the noise region, recognize the points assigned the noise point flags as noise points, and remove the recognized noise points. On the other hand, when the brightness of the ROI is less than or equal to the threshold value, the LIDAR noise removal apparatus 100 may be configured to assign object point flags to all points in the noise region that corresponds to the ROI and modify a labeling parameter for the noise region.

In particular, the LIDAR noise removal apparatus 100 may be configured to modify the labeling parameter to decrease a distance threshold value for the distance between points in the noise region that corresponds to the ROI. In addition, the LIDAR noise removal apparatus 100 may be configured to check the number of object points of a labeled object in the noise region that corresponds to the ROI and perform filtering based on the number of the object points of the labeled object to recognize the object. For example, when the number of the object points of the labeled object is two or less, the LIDAR noise removal apparatus 100 may be configured to determine the object points to be noise points and thus remove the object.

As stated above, according to the present disclosure, the LIDAR noise removal apparatus may be configured to predict a direction and a position relative to the sun based on Global Positioning System (GPS) information and image information to effectively remove noise points resulting from sunlight without loss in object information. Further, according to the present disclosure, the LIDAR noise removal apparatus may be configured to effectively remove noise resulting from sunlight to prevent the noise from affecting the size of an object or being erroneously detected as an object in the process of processing a LIDAR signal.

In other words, according to the present disclosure, the LIDAR noise removal apparatus may be configured to recognize and trace the traveling direction of the vehicle and the direction and angle of the sun to remove noise resulting from sunlight, thereby securing the optimum object recognition logic performance. In addition, according to the present disclosure, the LIDAR noise removal apparatus may be configured to remove irregular sun noise to more accurately recognize an object.

Figure 2:
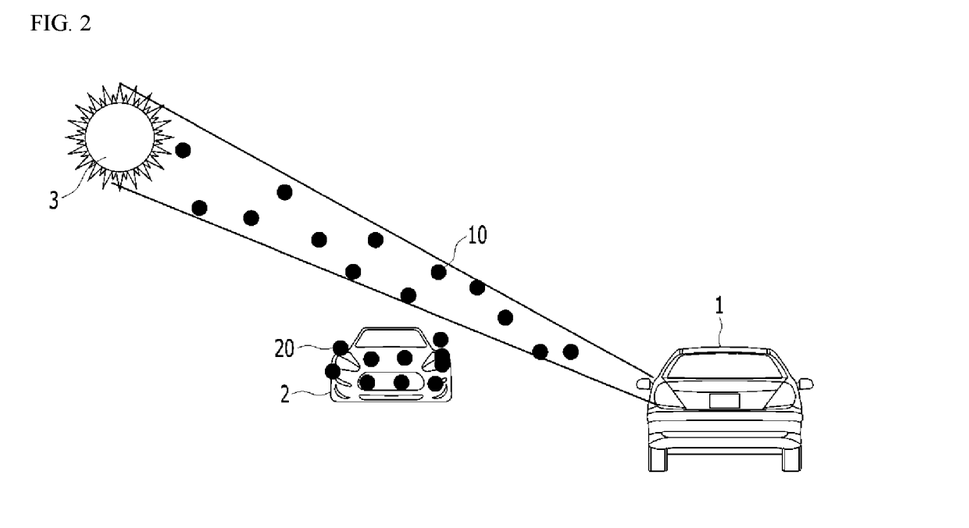
FIG. 2 is a view illustrating noise points generated by sunlight according to an exemplary embodiment of the present disclosure.

FIG. 2 is a view illustrating noise points generated by sunlight. As shown in FIG. 2, the LIDAR noise removal apparatus of the present disclosure may be configured to receive LIDAR detection information from the LIDAR of the vehicle 1 and parse the received LIDAR detection information to process the same.

Particularly, the LIDAR detection information may include noise points 10 irregularly generated in the direction of the sun 3. The noise points 10 in the LIDAR detection information may adversely affect accuracy of detection of object points 20 when an object 2 such as a surrounding vehicle is present in the direction of the sun 3. Accordingly, the LIDAR noise removal apparatus of the present disclosure may be configured to estimate direction and position components relative to the sun 3 to remove the noise points 10 resulting from the sunlight and effectively extract the object 2.

Figure 3:
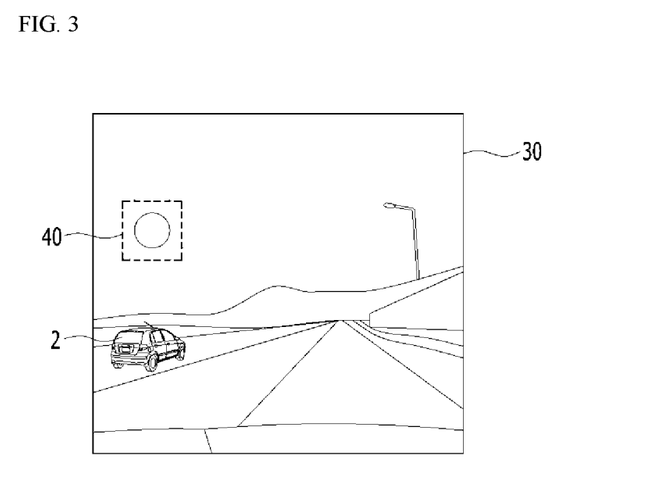
FIG. 3 is a view illustrating an ROI image corresponding to the sun extracted from a front image of the vehicle according to an exemplary embodiment of the present disclosure.

FIG. 3 is a view illustrating an ROI image corresponding to the sun extracted from a front image of the vehicle. As shown in FIG. 3, the LIDAR noise removal apparatus of the present disclosure may acquire a front image 30 of the vehicle, convert the azimuth angle and elevation angle of the sun into coordinates of the front image 30 and select an ROI 40 corresponding to the sun from the front image 30.

In particular, upon selecting the ROI 40 that corresponds to the sun from the front image 30 of the vehicle, the LIDAR noise removal apparatus may be configured to calculate a brightness of the selected ROI 40 and compare the calculated brightness of the ROI 40 with a threshold value to determine whether the object 2 is present between the sun and the vehicle. For example, the LIDAR noise removal apparatus may be configured to convert an image of the selected ROI into a grayscale image and calculate the brightness of the ROI using a binary value of the converted image, but is not limited thereto.

The LIDAR noise removal apparatus may be configured to determine that there is no object between the sun and the vehicle, when the brightness of the ROI 40 is greater than the threshold value, and may be configured to determine that the object 2 is present between the sun and the vehicle, when the brightness of the ROI 40 is less than or equal to the threshold value. When the elevation of the sun is so low as to be about 10° or less from the horizon, the object 2 may be present between the sun and the vehicle even though the brightness of the ROI 40 in the front image is greater than the threshold value. In this case, the LIDAR noise removal apparatus may be configured to increase the threshold value over a reference threshold value.

This results from the fact that, when the elevation of the sun is about 10° or less from the horizon, the object 2 existing in front of the sun may be misrecognized and removed as noise resulting from the sun when the brightness of the ROI that corresponds to the sun in the front image is greater than the threshold value even though the sun is present behind the object 2. Therefore, when the elevation of the sun is about 10° or less from the horizon, the LIDAR noise removal apparatus may be configured to set the threshold value to a higher value (e.g., an increased value) to prevent the object 2 from being misrecognized and removed as noise resulting from the sun even when the brightness of the ROI in which the object 2 is present between the sun and the vehicle is greater than the threshold value.

The LIDAR noise removal apparatus of the present disclosure may be configured to calculate the position of the sun relative to the traveling direction of the vehicle using GPS position information and heading information of the vehicle, select a range of a noise candidate group through a calculated direction (including a horizontal direction and a vertical direction), and then determine whether sunlight is irradiated to the vehicle, using the front image of the vehicle. In particular, when the sun is present in the front image of the vehicle, the LIDAR noise removal apparatus may be configured to select an ROI relative to the azimuth and elevation of the sun and compare a brightness of the selected ROI with a threshold value.

Then, the LIDAR noise removal apparatus may be configured to check a relation between points in LIDAR detection information based on a result of the comparison between the brightness of the ROI and the threshold value to more accurately remove noise resulting from the sunlight. When the elevation of the sun is so similar to the horizon to be positioned on the same line as the object 2, namely, when the elevation of the sun is about 10° or less from the horizon, the LIDAR noise removal apparatus may be configured to set the threshold value for the brightness of the ROI to a higher value.

This is provided against the case where the brightness of the ROI in the front image may be high even though the sun is present behind the object 2. In general, due to properties of light, when the sun is present behind the object, the light is not projected to the LIDAR and only object point information may be measured by the LIDAR.

Figure 4:
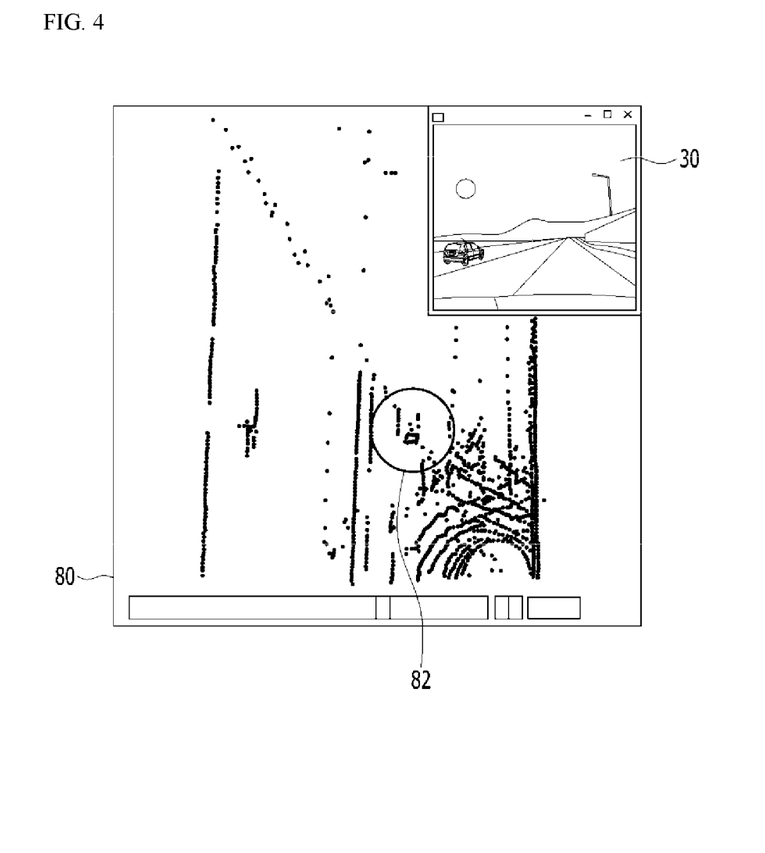
FIG. 4 is a view illustrating LIDAR detection information on an XY coordinate plane on which vehicle points and noise points resulting from sunlight are present in the same direction according to an exemplary embodiment of the present disclosure.
Figure 5:
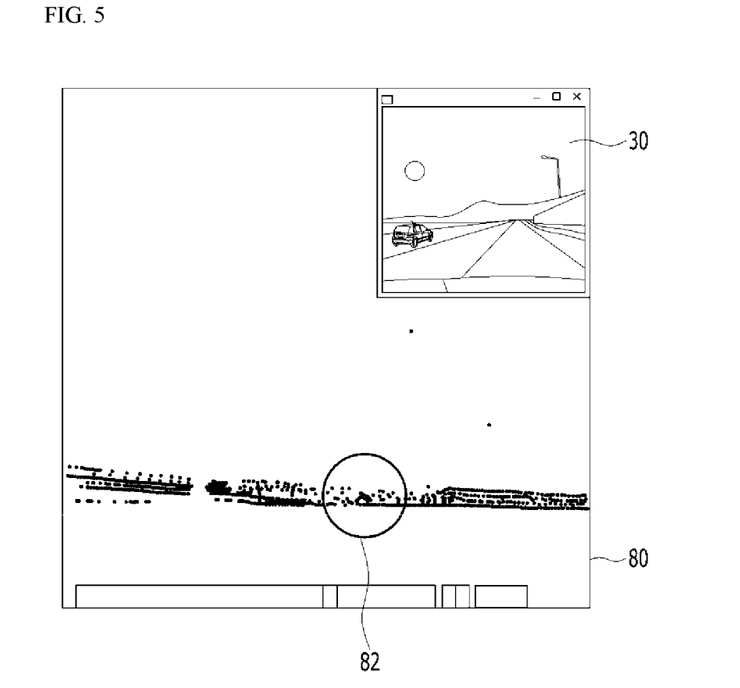
FIG. 5 is a view illustrating LIDAR detection information on a YZ coordinate plane on which vehicle points and noise points resulting from sunlight are present in the same direction according to an exemplary embodiment of the present disclosure.

FIG. 4 is a view illustrating LIDAR detection information on an XY coordinate plane on which vehicle points and noise points resulting from sunlight are present in the same direction, and FIG. 5 is a view illustrating LIDAR detection information on a YZ coordinate plane on which vehicle points and noise points resulting from sunlight are present in the same direction.

As shown in FIGS. 4 and 5, the LIDAR noise removal apparatus of the present disclosure may be configured to extract a layer of the LIDAR that corresponds to the elevation of the sun, an angle that corresponds to the azimuth of the sun and a filter value, and select a noise region the corresponds to an ROI from LIDAR detection information 80 based on the extracted layer, angle and filter value.

In particular, the LIDAR detection information 80 shows that noise points resulting from sunlight are formed along the direction of the sun. In addition, when an object is present between the sun and the vehicle, there is a point overlap region 82 including object points of the object and noise points resulting from sunlight distributed adjacent to and around the object. Therefore, the LIDAR noise removal apparatus of the present disclosure may be configured to compare a brightness of the ROI with a threshold value, recognize that an object is present between the sun and the vehicle, when the brightness of the ROI is less than or equal to the threshold value, and modify a labeling parameter for the noise region that corresponds to the ROI.

In other words, when the brightness of the ROI is less than or equal to the threshold value, the LIDAR noise removal apparatus may be configured to detect that an object is present between the sun and the vehicle, assign object point flags to all points in the noise region that corresponds to the ROI and modify a labeling parameter for the noise region. In particular, the LIDAR noise removal apparatus may be configured to modify the labeling parameter to decrease a distance threshold value for the distance between points in the noise region that corresponds to the ROI.

For example, the LIDAR noise removal apparatus may be configured to calculate the distance between points in the noise region that corresponds to the ROI and compare the calculated distance with the distance threshold value to determine whether the points are those connected to the object or those distant from the object. In addition, when the distance threshold value for the distance between points in the noise region that corresponds to the ROI is decreased, irregular noises resulting from sunlight may be labeled as different objects due to a decreased threshold distance.

Particularly, when there are about two object points or less in one labeled object, the LIDAR noise removal apparatus may be configured to determine the object to be noise and thus delete the same. In other words, the LIDAR noise removal apparatus may be configured to check the number of object points of a labeled object in the noise region that corresponds to the ROI and perform filtering based on the number of the object points of the labeled object to recognize the object.

Accordingly, when an object is present between the sun and the vehicle, through labeling in the point overlap region 82 including object points of the object and noise points resulting from sunlight distributed adjacent to and around the object, the LIDAR noise removal apparatus of the present disclosure may be configured to distinguish between the object points and the noise points and remove the discriminated noise points.

Figure 6:
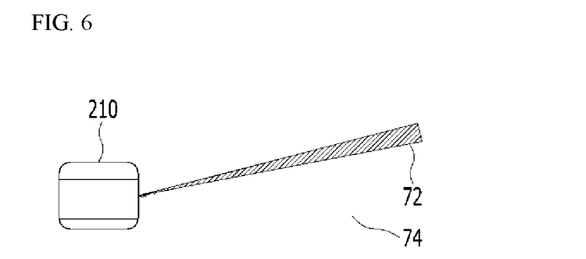
FIG. 6 is a view illustrating layers of a LIDAR and an elevation angle of the sun according to an exemplary embodiment of the present disclosure.
Figure 7A:
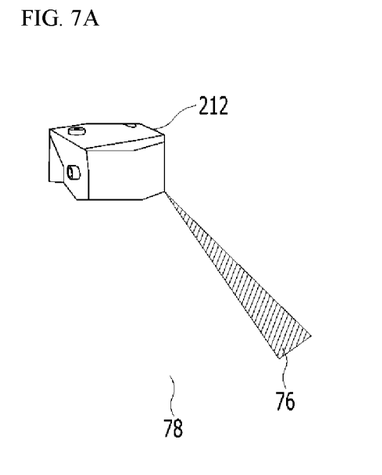
FIGS. 7A and 7B are views illustrating an FOV of the LIDAR and an azimuth angle of the sun according to an exemplary embodiment of the present disclosure.
Figure 7B:
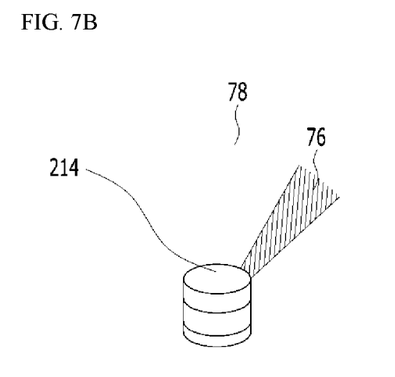

FIG. 6 is a view illustrating layers of a LIDAR and an elevation angle of the sun, and FIGS. 7A and 7B are views illustrating an FOV of the LIDAR and an azimuth angle of the sun. As shown in FIG. 6, the LIDAR 210 may be configured to sense surrounding object information of the vehicle and transmit LIDAR detection information to the LIDAR noise removal apparatus.

Particularly, the LIDAR 210 may be a multi-channel LIDAR including a front-side LIDAR 212 as in FIG. 7A and a front LIDAR 214 as in FIG. 7B, but is not limited thereto. For example, the multi-channel LIDAR may include a plurality of layers 74, each having a designated angle. As in FIG. 6, the present disclosure may predict the elevation angle 72 of the sun based on the layers 74 of the LIDAR 210. In addition, as in FIGS. 7A and 7B, the present disclosure may predict the azimuth angle 76 of the sun from a Field Of View (FOV) 78 of each of the LIDARs 212 and 214. The LIDAR 210 may be configured to sense an object around the vehicle and generate LIDAR detection information of a LIDAR sensor coordinate base, which may be coordinate-converted into a coordinate base of a front image of the vehicle.

The present disclosure may predict an expected range of a noise signal using the elevation angle and azimuth angle of the sun that corresponds to heading information of the vehicle, select an ROI based on the predicted range and remove noise with respect to a layer of the LIDAR in which generation of the noise by sunlight is expected and an azimuth corresponding to the sun. The present disclosure may employ a method of using points other than points in a noise region resulting from sunlight, and a method of decreasing a distance threshold value between points in the process of clustering a noise region resulting from sunlight, and excluding sparse points from a candidate object target without labeling the sparse points.

In addition, the present disclosure may use a grid map or a voxel map in a clustering process. In the clustering process, the present disclosure may select a representative point in a voxel, calculate the distance between the representative point and a representative point in an adjacent voxel and compare the calculated distance with a distance threshold value to determine whether the corresponding object is one connected object or one distant object. When the distance threshold value is decreased, irregular sun noises may be labeled as different objects. In particular, When there are two object points or less in one labeled object, the present disclosure may determine the object to be noise and thus delete the same.

Figure 8:
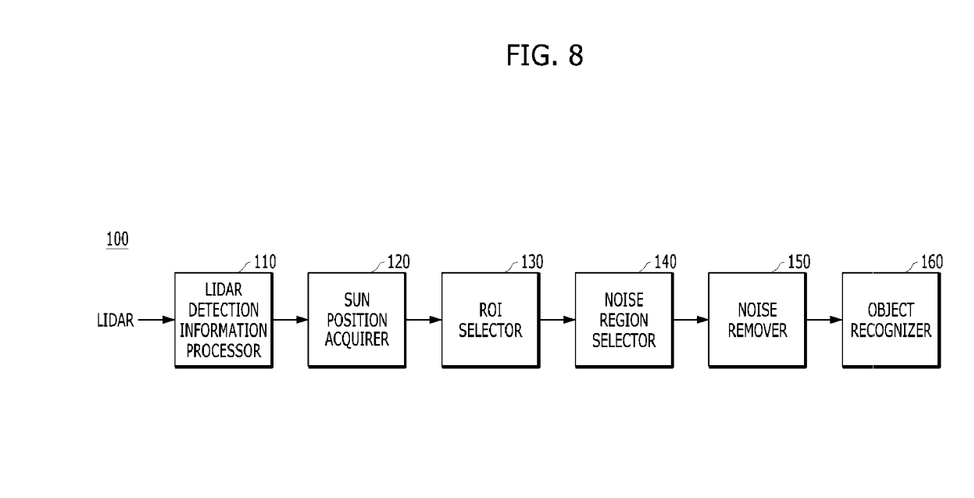
FIG. 8 is a block diagram illustrating a LIDAR noise removal apparatus according to an exemplary embodiment of the present disclosure.

FIG. 8 is a block diagram illustrating a LIDAR noise removal apparatus according to an exemplary embodiment of the present disclosure. As shown in FIG. 8, the LIDAR noise removal apparatus 100 of the present disclosure may include a LIDAR detection information processor 110, a sun position acquirer 120, an ROI selector 130, a noise region selector 140, a noise remover 150, and an object recognizer 160. Each of the components may be operated by a process of an overall controller.

In particular, the LIDAR detection information processor 110 may be configured to process LIDAR detection information received from the LIDAR of the vehicle. In other words, the LIDAR detection information processor 110 may be configured to receive the LIDAR detection information from the LIDAR of the vehicle and parse the received LIDAR detection information to process the same. The sun position acquirer 120 may be configured to acquire an azimuth angle and elevation angle of the sun relative to a traveling direction of the vehicle.

The sun position acquirer 120 may be configured to acquire position information, heading information and time information of the vehicle (using various sensors) and extract the azimuth angle and elevation angle of the sun relative to the traveling direction of the vehicle based on the acquired position information, heading information and time information of the vehicle. For example, the sun position acquirer 120 may be configured to acquire the position information, heading information and time information of the vehicle from a Global Positioning System (GPS).

The ROI selector 130 may be configured to select a Region Of Interest (ROI) that corresponds to the sun from a front image of the vehicle based on the acquired azimuth angle and elevation angle of the sun and compare a brightness of the selected ROI with a threshold value to determine whether the brightness of the ROI exceeds the threshold value. In particular, the ROI selector 130 may be configured to acquire the front image of the vehicle, convert the azimuth angle and elevation angle of the sun into coordinates of the LIDAR and coordinates of the front image and select the ROI that corresponds to the sun from the front image.

For example, the ROI selector 130 may be configured to acquire the front image of the vehicle from a front camera of the vehicle. In addition, the ROI selector 130 may be configured to calculate the brightness of the selected ROI and determine whether the calculated brightness of the ROI exceeds the threshold value. In particular, the ROI selector 130 may be configured to convert an image of the selected ROI into a grayscale image and calculate the brightness of the ROI using a binary value of the converted image.

In some cases, the ROI selector 130 may be configured to vary the threshold value based on a change in the elevation of the sun. For example, the ROI selector 130 may be configured to increase the threshold value when the elevation of the sun is about 10° or less from the horizon. This results from the fact that, when the elevation of the sun is about 10° or less from the horizon, an object existing in front of the sun may be misrecognized and removed as noise resulting from the sun when the brightness of the ROI that corresponds to the sun in the front image is greater than the threshold value even though the sun is present behind the object.

Therefore, when the elevation of the sun is about 10° or less from the horizon, the ROI selector 130 may be configured to set the threshold value to a higher value to prevent an object from being misrecognized and removed as noise resulting from the sun even when the brightness of the ROI in which the object is present between the sun and the vehicle is greater than the threshold value. The noise region selector 140 may be configured to select a noise region that corresponds to the ROI from the LIDAR detection information based on the azimuth angle and elevation angle of the sun when the brightness of the ROI exceeds the threshold value.

When the brightness of the ROI exceeds the threshold value, the noise region selector 140 may be configured to recognize that sunlight is irradiated to the vehicle. In addition, when the brightness of the ROI exceeds the threshold value, the noise region selector 140 may be configured to extract a layer of the LIDAR that corresponds to the elevation of the sun, an angle that corresponds to the azimuth of the sun and a filter value and select the noise region that corresponds to the ROI from the LIDAR detection information based on the extracted layer, angle and filter value.

For example, the filter value may be calculated and updated in real time based on a variation in time and a variation in heading of the vehicle. In addition, in response to determining that the sun and the vehicle maintain a Line Of Sight (LOS) and there is no object information therebetween, the noise region selector 140 may be configured to extract a layer of the LIDAR that corresponds to the elevation of the sun and an angle that corresponds to the azimuth of the sun.

Further, the noise remover 150 may be configured to remove noise points in the selected noise region. In particular, when the noise region that corresponds to the ROI is selected, the noise remover 150 may be configured to assign noise point flags to points in the noise region. In other words, the noise remover 150 may be configured to recognize the points assigned the noise point flags as noise points and remove the recognized noise points.

The object recognizer 160 may be configured to recognize an object from the LIDAR detection information. When the brightness of the ROI is less than or equal to the threshold value, the object recognizer 160 may be configured to assign object point flags to all points in the noise region that corresponds to the ROI and modify a labeling parameter for the noise region. For example, the object recognizer 160 may be configured to modify the labeling parameter to decrease a distance threshold value for the distance between points in the noise region that corresponds to the ROI.

In addition, the object recognizer 160 may be configured to check the number of object points of a labeled object in the noise region that corresponds to the ROI and perform filtering based on the number of the object points of the labeled object to recognize the object. For example, when the number of the object points of the labeled object is about two or less, the object recognizer 160 may be configured to determine the object points to be noise points and thus remove the object.

Figure 9:
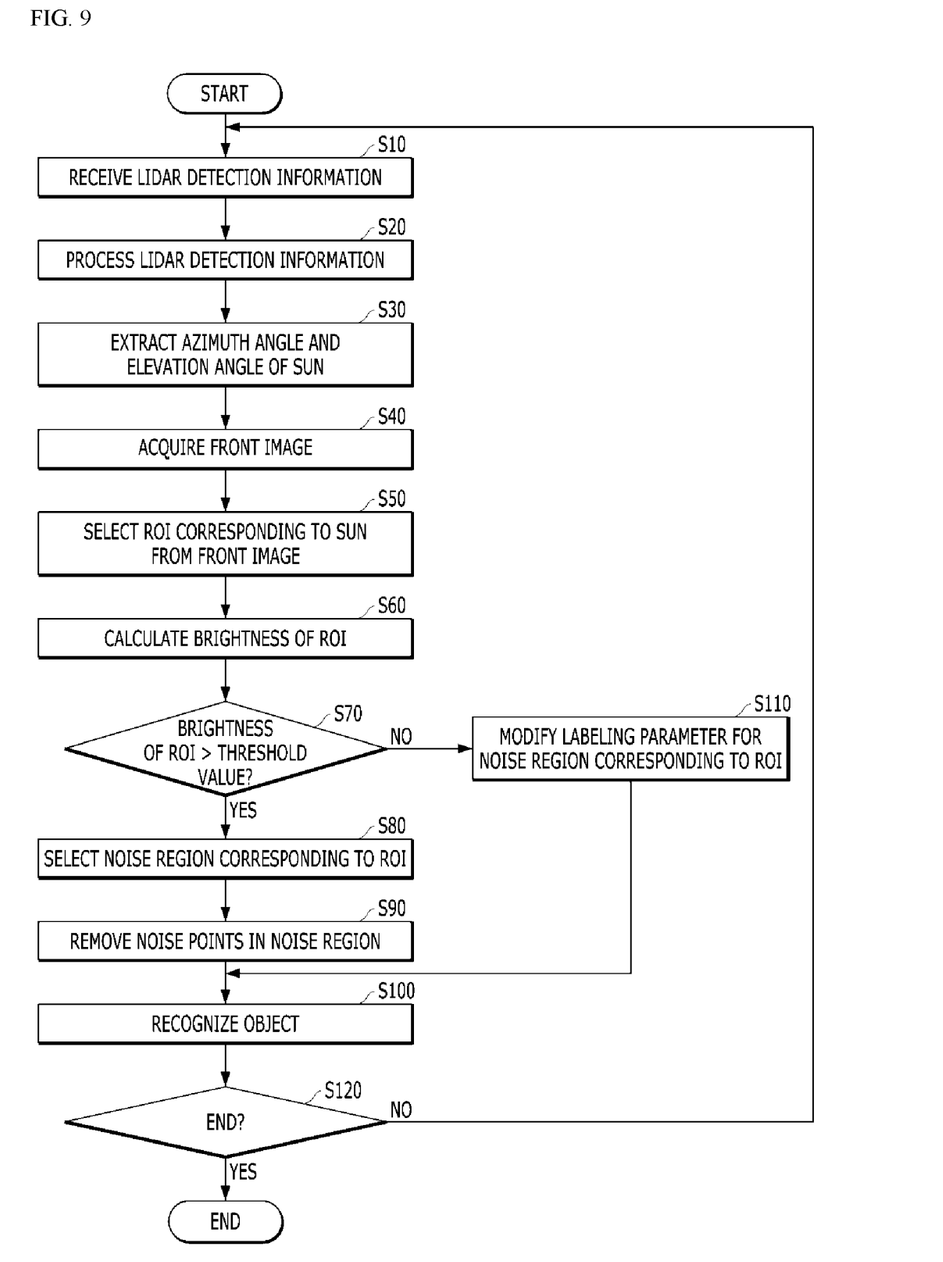
FIG. 9 is a flowchart illustrating a LIDAR noise removal method of a LIDAR noise removal apparatus according to an exemplary embodiment of the present disclosure.

FIG. 9 is a flowchart illustrating a LIDAR noise removal method of a LIDAR noise removal apparatus according to an exemplary embodiment of the present disclosure. The method described herein below may be executed by a process of a controller. As shown in FIG. 9, the present disclosure may receive LIDAR detection information from a LIDAR of a vehicle (S10). In response to receiving the LIDAR detection information, the present disclosure may parse the received LIDAR detection information to process the same (S20).

Then, the present disclosure may acquire position information, heading information and time information of the vehicle and extract an azimuth angle and elevation angle of the sun relative to a traveling direction of the vehicle based on the acquired position information, heading information and time information of the vehicle (S30). The position information, heading information and time information of the vehicle may be acquired from a Global Positioning System (GPS).

Further, the present disclosure may acquire a front image of the vehicle (S40). In particular, the front image of the vehicle may be acquired from a camera or other imaging device of the vehicle. Then, the present disclosure may convert the azimuth angle and elevation angle of the sun into coordinates of the LIDAR and coordinates of the front image and select a Region Of Interest (ROI) that corresponds to the sun from the front image based on the converted azimuth angle and elevation angle of the sun (S50).

The present disclosure may then calculate a brightness of the selected ROI (S60). In particulra, the present disclosure may convert an image of the selected ROI into a grayscale image and calculate the brightness of the ROI using a binary value of the converted image. The present disclosure may determine whether the calculated brightness of the ROI exceeds a threshold value (S70). In particular, the threshold value may be varied based on the elevation of the sun. For example, the threshold value may be increased over a reference threshold value when the elevation of the sun is about 10° or less from the horizon.

When the brightness of the ROI exceeds the threshold value, the present disclosure may select a noise region that corresponds to the ROI from the LIDAR detection information based on the azimuth angle and elevation angle of the sun (S80). When the brightness of the ROI exceeds the threshold value, the present disclosure may recognize that sunlight is irradiated to the vehicle.

In addition, when the brightness of the ROI exceeds the threshold value, the present disclosure may extract a layer of the LIDAR that corresponds to the elevation of the sun, an angle that corresponds to the azimuth of the sun and a filter value and select the noise region that corresponds to the ROI from the LIDAR detection information based on the extracted layer, angle and filter value. For example, the filter value may be calculated and updated in real time based on a variation in time and a variation in heading of the vehicle.

Further, the present disclosure may remove noise points in the selected noise region (S90). When the noise region that corresponds to the ROI is selected, the present disclosure may assign noise point flags to points in the noise region, recognize the points assigned the noise point flags as noise points and remove the recognized noise points. On the other hand, when the brightness of the ROI is less than or equal to the threshold value, the present disclosure may assign object point flags to all points in the noise region corresponding to the ROI and modify a labeling parameter for the noise region (S110). In modifying the labeling parameter for the noise region that corresponds to the ROI, the present disclosure may modify the labeling parameter to decrease a distance threshold value for the distance between points in the noise region.

Then, the present disclosure may recognize an object from the LIDAR detection information (S100). In particular, the present disclosure may check the number of object points of a labeled object in the noise region that corresponds to the ROI and perform filtering based on the number of the object points of the labeled object to recognize the object. For example, when the number of the object points of the labeled object is two or less, the present disclosure may determine the object points to be noise points and thus remove the object.

Additionally, the present disclosure determines whether the current situation is a LIDAR noise removal operation end situation (S120). In response to determining that the current situation is the LIDAR noise removal operation end situation, the present disclosure may end the LIDAR noise removal operation. On the other hand, the present disclosure may provide a non-transitory computer-readable recording medium for storing a program for execution of the LIDAR noise removal method of the LIDAR noise removal apparatus, which may execute the processes included in the LIDAR noise removal method.

As described above, according to the present disclosure, it may be possible to predict a direction and a position relative to the sun based on Global Positioning System (GPS) information and image information to effectively remove noise points resulting from sunlight without loss in object information. Further, according to the present disclosure, it may be possible to effectively remove noise resulting from sunlight to prevent the noise from affecting the size of an object or being erroneously detected as an object in the process of processing a LIDAR signal.

In other words, according to the present disclosure, it may be possible to recognize and trace the traveling direction of the vehicle and the direction and angle of the sun to remove noise resulting from sunlight, thereby securing the optimum object recognition logic performance. In addition, according to the present disclosure, it may be possible to remove irregular sun noise to recognize an object more accurately.

The above-described LIDAR noise removal method of the present disclosure may be implemented as computer-readable code on the program storage medium. The non-transitory computer-readable medium may be any type of recording device in which data is stored in a computer-readable manner. The non-transitory computer-readable medium may include, for example, a hard disk drive (HDD), a solid-state disk (SSD), a silicon disk drive (SDD), a read-only memory (ROM), a random access memory (RAM), a compact disc read-only memory (CD-ROM), a magnetic tape, a floppy disk, and an optical data storage device.

It will be appreciated by those skilled in the art that the effects achievable through the present disclosure are not limited to those that have been particularly described hereinabove and that other effects of the present disclosure will be more clearly understood from the above detailed description.

The above detailed description is not to be construed as limiting the present disclosure in any aspect, but is to be considered by way of example. The scope of the present disclosure should be determined by reasonable interpretation of the accompanying claims, and all equivalent modifications made without departing from the scope of the present disclosure should be understood to be included in the following claims.

What is claimed is:

1. A LIDAR noise removal apparatus, comprising:
   a LIDAR detection information processor configured to process LIDAR detection information received from a LIDAR of a vehicle;
   a sun position acquirer configured to acquire an azimuth angle and elevation angle of the sun relative to a traveling direction of the vehicle;
   a Region Of Interest (ROI) selector configured to select an ROI that corresponds to the sun from an image seen from the front of the vehicle based on the acquired azimuth angle and elevation angle of the sun and compare a brightness of the selected ROI with a threshold value to determine whether the brightness of the ROI exceeds the threshold value;
   a noise region selector configured to select a noise region that corresponds to the ROI from the LIDAR detection information based on the azimuth angle and elevation angle of the sun when the brightness of the ROI exceeds the threshold value;
   a noise remover configured to remove noise points in the selected noise region; and
   an object recognizer configured to recognize an object from the LIDAR detection information,
   wherein the object recognizer is configured to assign object point flags to all points in the noise region that corresponds to the ROI or is configured to check the number of object points of a labeled object in the noise region that corresponds to the ROI.

2. The LIDAR noise removal apparatus according to claim 1, wherein the LIDAR detection information processor is configured to receive the LIDAR detection information from the LIDAR of the vehicle and parse the received LIDAR detection information to process the same.

3. The LIDAR noise removal apparatus according to claim 1, wherein the sun position acquirer is configured to acquire position information, heading information and time information of the vehicle and extracts the azimuth angle and elevation angle of the sun relative to the traveling direction of the vehicle based on the acquired position information, heading information and time information of the vehicle.

4. The LIDAR noise removal apparatus according to claim 1, wherein the ROI selector is configured to acquire the image seen from the front of the vehicle, convert the azimuth angle and elevation angle of the sun into coordinates of the LIDAR and coordinate of the front image and select the ROI that corresponds to the sun from the front image.

5. The LIDAR noise removal apparatus according to claim 1, wherein the noise region selector is configured to recognize that sunlight is irradiated to the vehicle, when the brightness of the ROI exceeds the threshold value.

6. The LIDAR noise removal apparatus according to claim 1, wherein the noise region selector is configured to extract a layer of the LIDAR that corresponds to an elevation of the sun, an angle that corresponds to an azimuth of the sun and a filter value when the brightness of the ROI exceeds the threshold value and selects the noise region that corresponds to the ROI from the LIDAR detection information based on the extracted layer, angle and filter value.

7. The LIDAR noise removal apparatus according to claim 1, wherein the object recognizer is configured to assign object point flags to all points in the noise region that correspond to the ROI when the brightness of the ROI is less than or equal to the threshold value and modify a labeling parameter for the noise region that corresponds to the ROI.

8. The LIDAR noise removal apparatus according to claim 7, wherein the object recognizer is configured to modify the labeling parameter to decrease a distance threshold value for a distance between points in the noise region corresponding to the ROI.

9. The LIDAR noise removal apparatus according to claim 1, wherein the object recognizer is configured to check the number of object points of a labeled object in the noise region that corresponds to the ROI and perform filtering based on the number of the object points of the labeled object to recognize the object.

10. A LIDAR noise removal method of a LIDAR noise removal apparatus, the LIDAR noise removal apparatus receiving LIDAR detection information from a LIDAR of a vehicle, the method comprising:
processing, by a processor, the LIDAR detection information received from the LIDAR of the vehicle;
acquiring, by the processor, an azimuth angle and elevation angle of the sun relative to a traveling direction of the vehicle;
selecting, by the processor, a Region Of Interest (ROI) that corresponds to the sun from an image seen from the front of the vehicle based on the acquired azimuth angle and elevation angle of the sun;
comparing, by the processor, a brightness of the selected ROI with a threshold value to determine whether the brightness of the ROI exceeds the threshold value;
selecting, by the processor, a noise region that corresponds to the ROI from the LIDAR detection information based on the azimuth angle and elevation angle of the sun when the brightness of the ROI exceeds the threshold value;
removing, by the processor, noise points in the selected noise region,
assigning, by the processor, object point flags to all points in the noise region that correspond to the ROI when the brightness of the ROI is less than or equal to the threshold value and modifying a labeling parameter for the noise region corresponding to the ROI; and
recognizing, by the processor, and object from the LIDAR detection information.

11. The LIDAR noise removal method according to claim 10, wherein the processing the LIDAR detection information includes:
receiving, by the processor, the LIDAR detection information from the LIDAR of the vehicle; and
parsing, by the processor, the received LIDAR detection information to process the same.

12. The LIDAR noise removal method according to claim 10, wherein acquiring an azimuth angle and elevation angle of the sun includes:
acquiring, by the processor, position information, heading information and time information of the vehicle; and
extracting, by the processor, the azimuth angle and elevation angle of the sun relative to the traveling direction of the vehicle based on the acquired position information, heading information and time information of the vehicle.

13. The LIDAR noise removal method according to claim 10, wherein selecting an ROI includes:
acquiring, by the processor, the image seen from the front of the vehicle;
converting, by the processor, the azimuth angle and elevation angle of the sun into coordinates of the LIDAR and coordinates of the front image; and
selecting, by the processor, the ROI that corresponds to the sun from the front image based on the converted azimuth angle and elevation angle of the sun.

14. The LIDAR noise removal method according to claim 10, wherein selecting a noise region corresponding to the ROI includes recognizing that sunlight is irradiated to the vehicle, when the brightness of the ROI exceeds the threshold value.

15. The LIDAR noise removal method according to claim 10, wherein modifying a labeling parameter for the noise region corresponding to the ROI includes modifying the labeling parameter to decrease a distance threshold value for a distance between points in the noise region that corresponds to the ROI.

16. The LIDAR noise removal method according to claim 10, wherein recognizing an object from the LIDAR detection information includes checking the number of object points of a labeled object in the noise region that corresponds to the ROI and performing filtering based on the number of the object points of the labeled object to recognize the object.

17. A non-transitory computer-readable recording medium for storing a program for executing the method according to claim 10.

18. A vehicle, comprising:
a LIDAR configured to sense surrounding object information of the vehicle;
a camera configured to acquire an image seen from the front of the vehicle; and
a LIDAR noise removal apparatus configured to remove noise points that correspond to sunlight incident on the LIDAR,
wherein the LIDAR noise removal apparatus includes:
a LIDAR detection information processor configured to process LIDAR detection information received from the LIDAR;
a sun position acquirer configured to acquire an azimuth angle and elevation angle of the sun relative to a traveling direction of the vehicle;
a Region Of Interest (ROI) selector configured to select an ROI that corresponds to the sun from the image seen from the front of the vehicle based on the acquired azimuth angle and elevation angle of the sun and compare a brightness of the selected ROI with a threshold value to determine whether the brightness of the ROI exceeds the threshold value;
a noise region selector configured to select a noise region that corresponds to the ROI from the LIDAR detection information based on the azimuth angle and elevation angle of the sun when the brightness of the ROI exceeds the threshold value;
a noise remover configured to remove noise points in the selected noise region; and
an object recognizer configured to recognize an object from the LIDAR detection information,
wherein the object recognizer is configured to assign object point flags to all points in the noise region that corresponds to the ROI or is configured to check the number of object points of a labeled object in the noise region that corresponds to the ROI.

* * * * *